United States Patent
Fukui et al.

(10) Patent No.: US 10,873,225 B2
(45) Date of Patent: Dec. 22, 2020

(54) ROTOR FOR ROTARY ELECTRIC MACHINE HAVING A GAP FOR ALLEVIATING STRESS DURING ROTATION

(71) Applicant: HONDA MOTOR CO., LTD., Tokyo (JP)

(72) Inventors: Kentaro Fukui, Saitama (JP); Masashi Inoue, Saitama (JP)

(73) Assignee: HONDA MOTOR CO.. LTD., Tokyo (JP)

( * ) Notice: Subject to any disclaimer, the term of this patent is extended or adjusted under 35 U.S.C. 154(b) by 27 days.

(21) Appl. No.: 16/236,822

(22) Filed: Dec. 31, 2018

(65) Prior Publication Data

US 2019/0214861 A1   Jul. 11, 2019

(30) Foreign Application Priority Data

Jan. 11, 2018   (JP) .................................. 2018-002787

(51) Int. Cl.
*H02K 1/27*   (2006.01)

(52) U.S. Cl.
CPC ......... *H02K 1/276* (2013.01); *H02K 2213/03* (2013.01)

(58) Field of Classification Search
CPC ...... H02K 1/276; H02K 1/2753; H02K 1/274; H02K 1/272; H02K 1/2706; H02K 2213/03

(Continued)

(56) References Cited

U.S. PATENT DOCUMENTS 5,990,591 A * 11/1999 Yamaguchi ............ H02K 1/276
310/12.18
6,437,473 B1 * 8/2002 Mobius ................ H02K 1/2766
29/598

(Continued)

FOREIGN PATENT DOCUMENTS

CN      106416001 A     2/2017
CN      107437858 A    12/2017

(Continued)

OTHER PUBLICATIONS

Machine translation of JP-2003088071-A. (Year: 2003).*

(Continued)

*Primary Examiner* — Michael Andrews
(74) *Attorney, Agent, or Firm* — Paratus Law Group, PLLC

(57) ABSTRACT

A rotor for a rotary electric machine includes: a rotor core which includes a magnet insertion hole; and a permanent magnet housed in the magnet insertion hole. The permanent magnet has an arc shape which is convex toward an axial line. The rotor core includes: an outer-circumference core part; an inner-circumference core part; and connection ribs which connect the outer-circumference core part and the inner-circumference core part. The permanent magnet is supported in the rotor core in such a manner that circumferential ends abut on an inner surface of the magnet insertion hole. A circumferential center portion of the permanent magnet is separated from an outer-circumference-side inner surface of the magnet insertion hole. In the circumferential center portion of the permanent magnet, a gap is provided between an outer-circumference-side outer surface of the permanent magnet and the outer-circumference-side inner surface of the magnet insertion hole.

3 Claims, 6 Drawing Sheets

(58) Field of Classification Search
USPC ............. 310/156.53, 156.45, 156.38, 156.43
See application file for complete search history.

(56) References Cited

U.S. PATENT DOCUMENTS

| | | | |
|---|---|---|---|
| 6,717,315 B1 | 4/2004 | Tajima et al. | |
| 2017/0070112 A1 | 3/2017 | Ishikawa et al. | |
| 2018/0041080 A1* | 2/2018 | Nakano ................. | H02K 15/02 |
| 2018/0183286 A1* | 6/2018 | Nakano ................. | H02K 1/274 |

FOREIGN PATENT DOCUMENTS

| | | | |
|---|---|---|---|
| CN | 107492964 A | | 12/2017 |
| JP | H10-295051 A | | 11/1998 |
| JP | 2003-088071 A | | 3/2003 |
| JP | 2003088071 A | * | 3/2003 |
| JP | 2004-328859 A | | 11/2004 |
| JP | 2007-306688 A | | 11/2007 |
| JP | 2014-100048 A | | 5/2014 |
| WO | WO 01/043259 A1 | | 6/2001 |
| WO | WO 2016/185829 A1 | | 11/2016 |

OTHER PUBLICATIONS

May 28, 2019, Japanese Office Action issued for related JP Application No. 2018-002787.
Jul. 3, 2020, Chinese Office Action issued for related CN application No. 201910003765.3.

* cited by examiner

ROTOR FOR ROTARY ELECTRIC MACHINE HAVING A GAP FOR ALLEVIATING STRESS DURING ROTATION

CROSS-REFERENCE TO RELATED APPLICATIONS

This application is based on and claims priority under 35 USC 119 from Japanese Patent Application No. 2018-002787 filed on Jan. 11, 2018, the contents of which are incorporated herein by reference.

TECHNICAL FIELD

The present disclosure relates to a rotor for a rotary electric machine which is mounted on an electric vehicle or the like.

BACKGROUND

In the related art, a so-called IPM motor where a plurality of permanent magnets are arranged at predetermined intervals in a circumferential direction in a rotor core is known as a rotor used in a rotary electric machine. In such an IPM motor, an arc-shaped permanent magnet is arranged to be convex toward a rotation axis line and the technique described in Patent Literature 1 (Japanese Patent Application Laid-Open Publication No. 2007-306688) or Patent Literature 2 (Japanese Patent Application Laid-Open Publication No. 2014-100048) is known, for example, as a unit for fixing the arc-shaped permanent magnet in the rotor core.

In Patent Literature 1, a configuration is disclosed in which the rotor core and the arc-shaped permanent magnet are fixed by surface contact so as to provide a hole for caulking on an outer circumference side of the rotor, and deform the rotor core by pressure at the same time when the rotor core is caulked by a rivet pin.

In Patent Literature 2, a configuration is disclosed in which the rotor core and the permanent magnet are fixed in such a manner that both circumferential end surfaces of the arc-shaped permanent magnet are brought into contact with support projections provided in the vicinity of both circumferential ends of a magnet insertion hole when viewed from the direction of the rotation axis line of the rotor core.

However, the circumferential center portion of the permanent magnet in the rotor for the rotary electric machine of Patent Literature 1 and Patent Literature 2 abuts on the outer-circumference-lateral inner surface of the magnet insertion hole of the rotor core.

Accordingly, when a manufacturing error occurs in the permanent magnet and the rotor rotates at a high speed, an excessive stress is generated due to the centrifugal force of the permanent magnet in the circumferential center portion of the outer-circumference-side inner surface of the magnet insertion hole, whereby it is concerned that the connection rib of the rotor core may be deformed.

The present disclosure provides a rotor for a rotary electric machine in which it is avoidable that excessive stress is generated in a circumferential center portion of an outer-circumference-side inner surface of a magnet insertion hole during rotation of a rotor although an manufacturing error occurs in a permanent magnet.

SUMMARY

A rotor for a rotary electric machine related to the present disclosure includes: a rotor core which rotates around an axial line and includes a magnet insertion hole extending in parallel to the axial line; and a permanent magnet which is housed in the magnet insertion hole. The permanent magnet has an arc shape which is convex toward the axial line when viewed from a direction of the axial line. The rotor core includes: an outer-circumference core part which is positioned on an outer-circumference-side of the magnet insertion hole; an inner-circumference core part which is positioned on an inner-circumference-side of the magnet insertion hole; and connection ribs which are positioned in both circumferential ends of the magnet insertion hole and connect the outer-circumference core part and the inner-circumference core part. The permanent magnet is supported in the rotor core in such a manner that circumferential ends which are positioned on both circumferential sides of the permanent magnet abut on an inner surface of the magnet insertion hole. A circumferential center portion of the permanent magnet is separated from an outer-circumference-side inner surface of the magnet insertion hole. In the circumferential center portion of the permanent magnet, a gap is provided between an outer-circumference-side outer surface of the permanent magnet and the outer-circumference-side inner surface of the magnet insertion hole.

According to the present disclosure, in the circumferential center portion of the permanent magnet, a gap is provided between the outer-circumference-side outer surface of the permanent magnet and the outer-circumference-side inner surface of the magnet insertion hole. Thus, it becomes possible to prevent the excessive stress from being generated in the circumferential center portion of the outer-circumference core part during the rotation of the rotor, even though a variation occurs due to the manufacturing error of the permanent magnet or the like. Therefore, the deformation of the connection rib having a relatively low strength during the rotation of the rotor can be suppressed even when the centrifugal force of the permanent magnet and the like is applied.

BRIEF DESCRIPTION OF DRAWINGS

Exemplary embodiments of the present invention will be described in detail based on the following figures, wherein.

DETAILED DESCRIPTION

Hereinafter, embodiments of a rotor for a rotary electric machine of the present disclosure will be described on the basis of the accompanying drawings.

First Embodiment

First, a rotor for a rotary electric machine of a first embodiment of the present disclosure will be described with reference to FIGS. 1 to 4.

Figure 1:
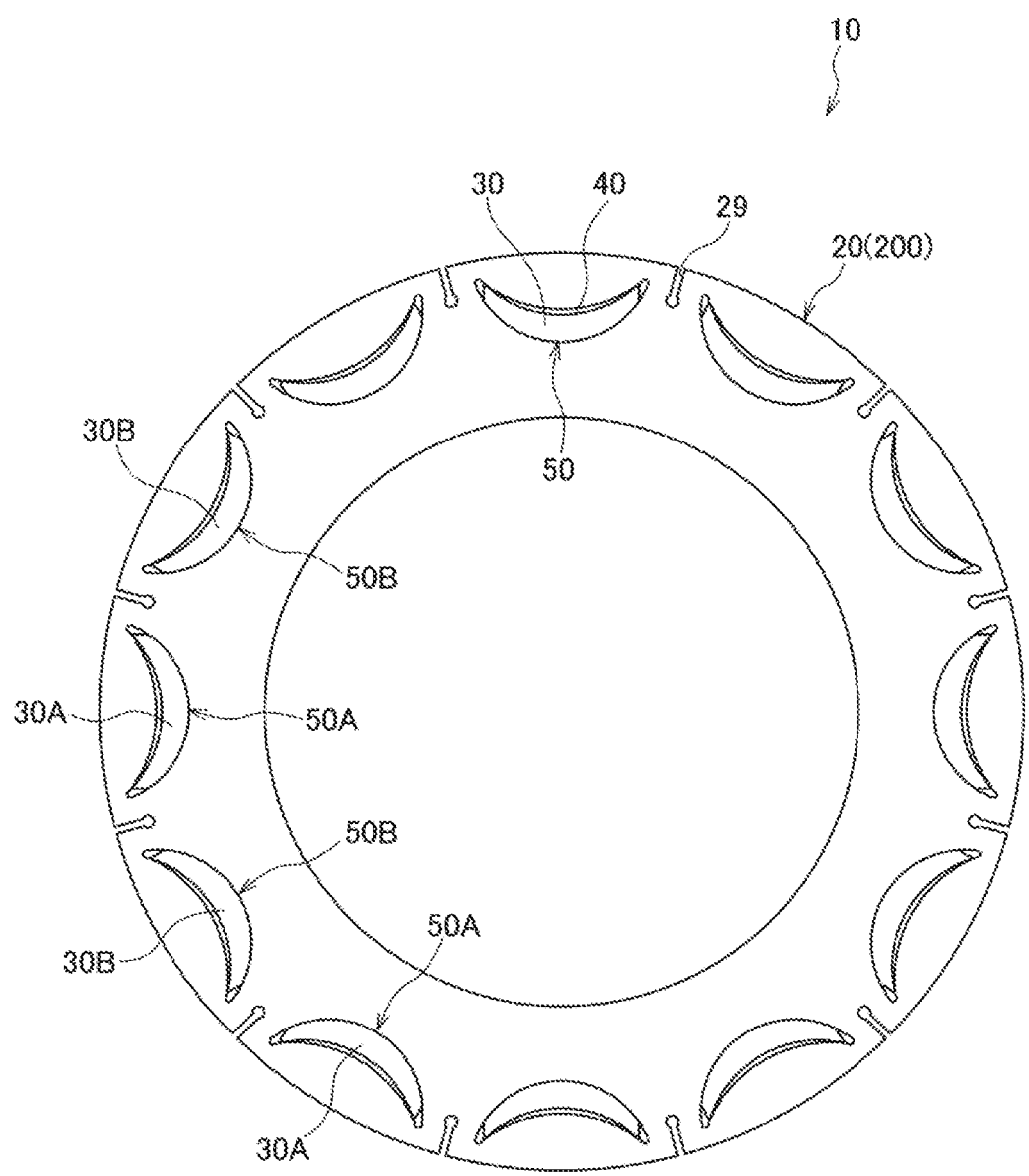
FIG. 1 is a front view illustrating a rotor for a rotary electric machine of a first embodiment when viewed from a rotational axis direction.

As illustrated in FIG. 1, a rotor for a rotary electric machine 10 of the first embodiment includes a rotor core 20 which is attached in an outer circumferential portion of a rotor shaft (not illustrated) and a plurality of magnetic pole parts 50 which are formed at predetermined intervals in a circumferential direction in the rotor core 20, and is arranged on an inner circumference side of a stator (not illustrated).

The rotor core 20 is formed by annular electromagnetic steel sheets having almost the same shape and, for example, is formed by stacking a plurality of silicon steel sheets 200 in an axial direction. A plurality of magnet insertion holes 40 are formed at predetermined intervals in the circumferential direction. In addition, a groove par 29 is provided to be recessed between the magnet insertion holes 40 adjacent to each other in the circumferential direction.

The magnetic pole part 50 is magnetized in a radial direction and is configured such that permanent magnets 30 are arranged in respective magnet insertion holes 40 to have magnetization directions alternately different from each other in the circumferential direction. More specifically, when an outer circumference side of a magnetic pole part 50A including a permanent magnet 30A arranged in the magnet insertion hole 40 is set to have an N-pole, an adjacent magnetic pole part 50B is configured by arranging a permanent magnet 30B in the magnet insertion hole 40 such that an outer circumference side thereof becomes an S-pole.

Figure 2:
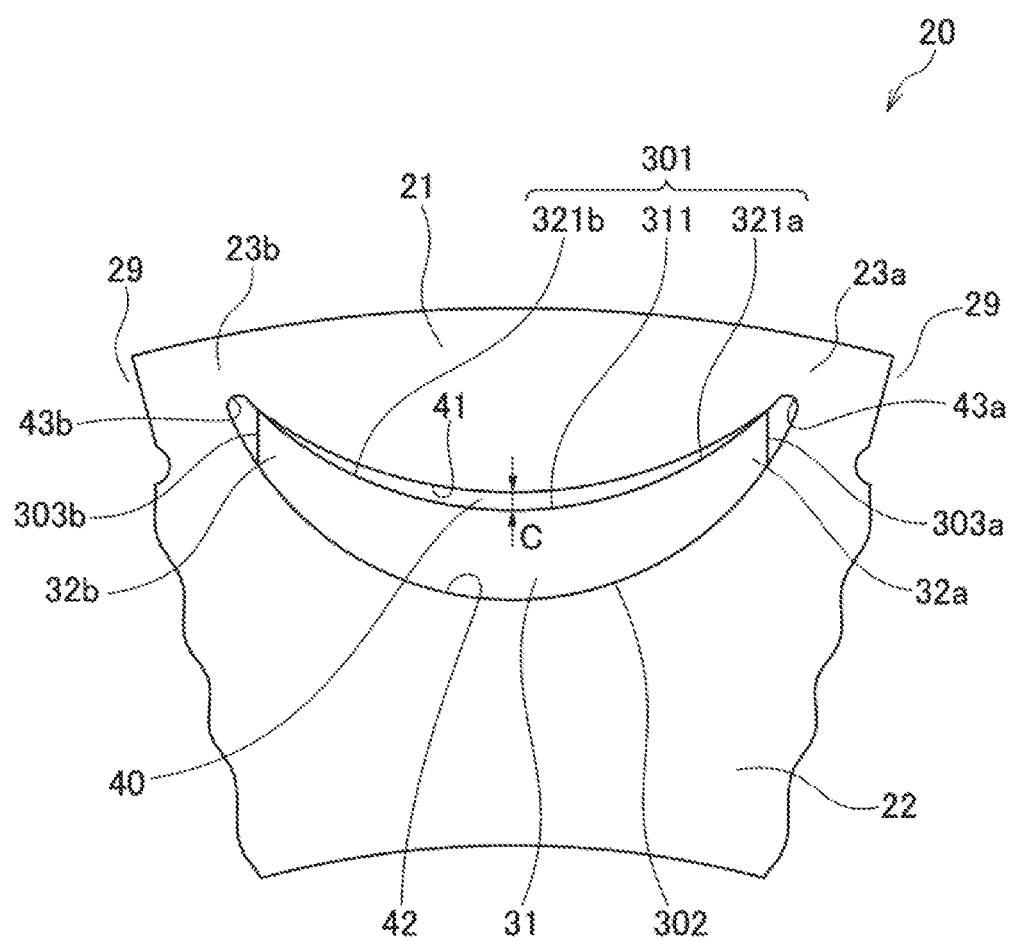
FIG. 2 is an enlarged view illustrating a magnet insertion hole of a rotor core in the rotor for the rotary electric machine of FIG. 1.

As illustrated in FIG. 2, the rotor core 20 includes the magnet insertion hole 40, an outer-circumference core part 21 which is positioned on the outer circumference side of the magnet insertion hole 40, an inner-circumference core part 22 which is positioned on the inner circumference side of the magnet insertion hole 40, a connection rib 23a which is positioned in a circumferential-one-end-side end of the magnet insertion hole 40 and connects the outer-circumference core part 21 and the inner-circumference core part 22, and a connection rib 23b which is positioned in a circumferential-other-end-side end of the magnet insertion hole 40 and connects the outer-circumference core part 21 and the inner-circumference core part 22.

The connection ribs 23a and 23b are formed such that the width is narrower than those of the outer-circumference core part 21 and the inner-circumference core part 22 and the strength is lower than those of the outer-circumference core part 21 and the inner-circumference core part 22.

The magnet insertion hole 40 includes an outer-circumference-side inner surface 41, an inner-circumference-side lateral inner surface 42, a circumferential-one-end-side lateral inner surface 43a, and a circumferential-other-end-side lateral inner surface 43b. The outer-circumference-side inner surface 41 of the magnet insertion hole 40 has an arc shape which is convex toward the rotation axis line of the rotor 10 when viewed from the rotation axis line direction of the rotor 10, and the circular arc radius of the outer-circumference-side inner surface 41 is larger than the circular arc radius of the inner-circumference-side lateral inner surface 42.

The permanent magnet 30 has an arc shape which is convex toward the rotation axis line of the rotor 10 when viewed from the rotation axis line direction of the rotor 10 and is housed in the magnet insertion hole 40. The permanent magnet 30 is formed integrally with a circumferential center part 31, a circumferential one end 32a, and a circumferential other end 32b and has such a shape that the thickness decreases from the circumferential center part 31 toward the circumferential one end 32a and the circumferential other end 32b.

The surface of the permanent magnet 30 includes an outer-circumference-side outer surface 301, an inner-circumference-side outer surface 302, a circumferential-one-end-side lateral surface 303a, and a circumferential-other-end-side lateral surface 303b. Further, the outer-circumference-side outer surface 301 of the permanent magnet 30 can be divided into an outer-circumference-side outer surface 311 positioned in the circumferential center portion, an outer-circumference-side outer surface 321a positioned in the circumferential one end, and an outer-circumference-side outer surface 321b positioned on the circumferential other end.

The permanent magnet 30 is fixed in the rotor core 20 by abutting on the inner surface of the magnet insertion hole 40 at both circumferential ends thereof, that is, the circumferential one end 32a and the circumferential other end 32b. Further, the circumferential center part 31 of the permanent magnet 30 is separated from the outer-circumference-side inner surface 41 of the magnet insertion hole 40. In the circumferential center part 31 of the permanent magnet 30, a gap C is provided between the outer-circumference-side outer surface 301 of the permanent magnet 30 and the outer-circumference-side inner surface 41 of the magnet insertion hole 40.

In this way, the outer-circumference-side inner surface 41 of the magnet insertion hole 40 does not come into contact with the outer-circumference-side outer surface 311 of the circumferential center portion of the permanent magnet 30. Thus, the excessive stress on the outer-circumference core part 21 during the rotation of the rotor 10 can be avoided even although a variation occurs due to the manufacturing error of the permanent magnet 30 or the like.

When a stress is generated in the circumferential center portion of the outer-circumference core part 21, a moment where the outer-circumference core part 21 is to be rotated around the connection ribs 23a and 23b occurs in the connection ribs 23a and 23b. When the stress is excessively applied to the circumferential center portion of the outer-circumference core part 21, the connection ribs 23a and 23b having a relatively low strength may be deformed. Therefore, in the circumferential center part 31 of the permanent magnet 30, the gap C is provided between the outer-circumference-side outer surface 301 of the permanent magnet 30 and the outer-circumference-side inner surface 41 of the magnet insertion hole 40, thereby reducing the stress generated due to the centrifugal force of the permanent magnet 30 or the like during the rotation of the rotor 10 in the outer-circumference core part 21 of the rotor core 20 and preventing the deformation of the connection ribs 23a and 23b even when the stress is generated in the rotor core 20.

Incidentally, the permanent magnet 30 may abut on the inner surface of the magnet insertion hole 40 at both circumferential ends of the circumferential one end 32a and the circumferential other end 32b. Any one of the outer-circumference-side inner surface 41, the circumferential-one-end-side lateral inner surface 43a, and the circumferential-other-end-side lateral inner surface 43b may be used as the inner surface of the magnet insertion hole 40 abutting on the permanent magnet 30 as long as the surface can receive the centrifugal force acting on the permanent magnet 30.

Figure 3:
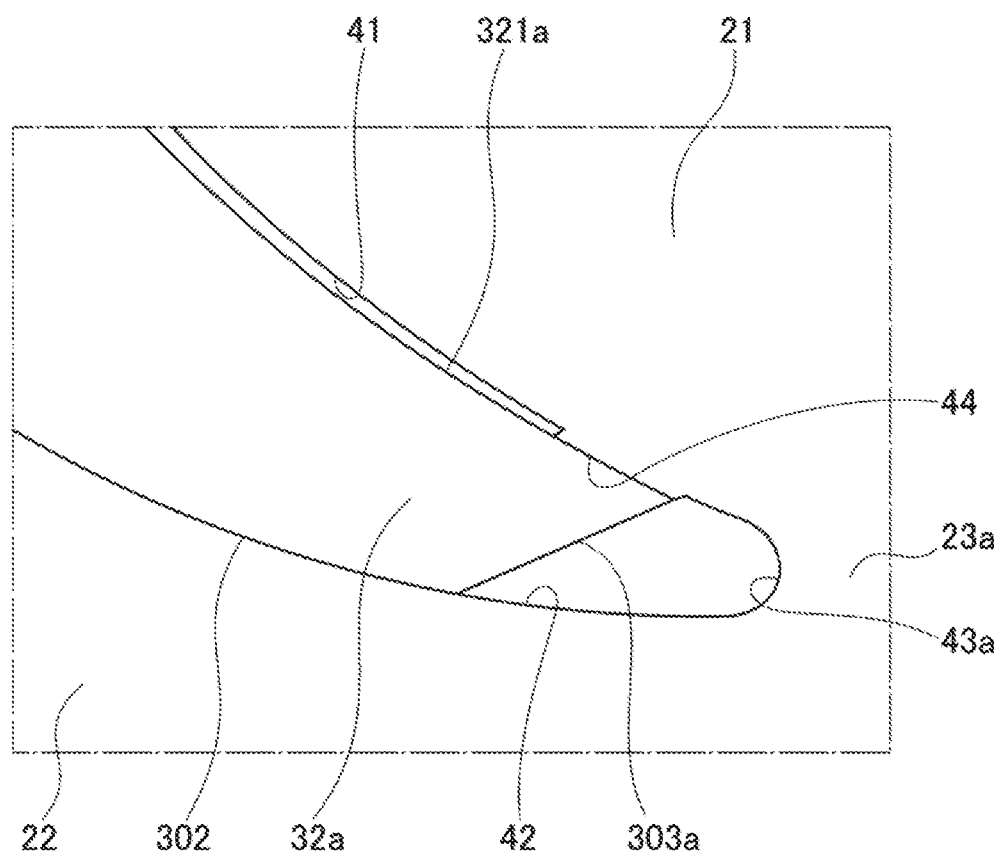
FIG. 3 is an enlarged view partially illustrating one example of the magnet insertion hole.

As illustrated in FIG. 3, a convex part 44 which abuts on the outer-circumference-side outer surfaces 321a and 321b of both circumferential ends of the permanent magnet 30 may be provided in the outer-circumference-side inner surface 41 of the magnet insertion hole 40.

In this case, the permanent magnet 30 is fixed in the rotor core 20 in such a manner that the outer-circumference-side outer surfaces 321a and 321b of the both circumferential ends abut on the convex part 44. Accordingly, in a state where the outer-circumference-side outer surfaces 321a and 321b of the both circumferential ends of the permanent magnet 30 abut on the outer-circumference-side inner surface 41 of the magnet insertion hole 40, a gap can be secured between the outer-circumference-side outer surface 311 of the circumferential center portion of the permanent magnet 30 and the outer-circumference-side inner surface 41 of the magnet insertion hole 40.

Figure 4:
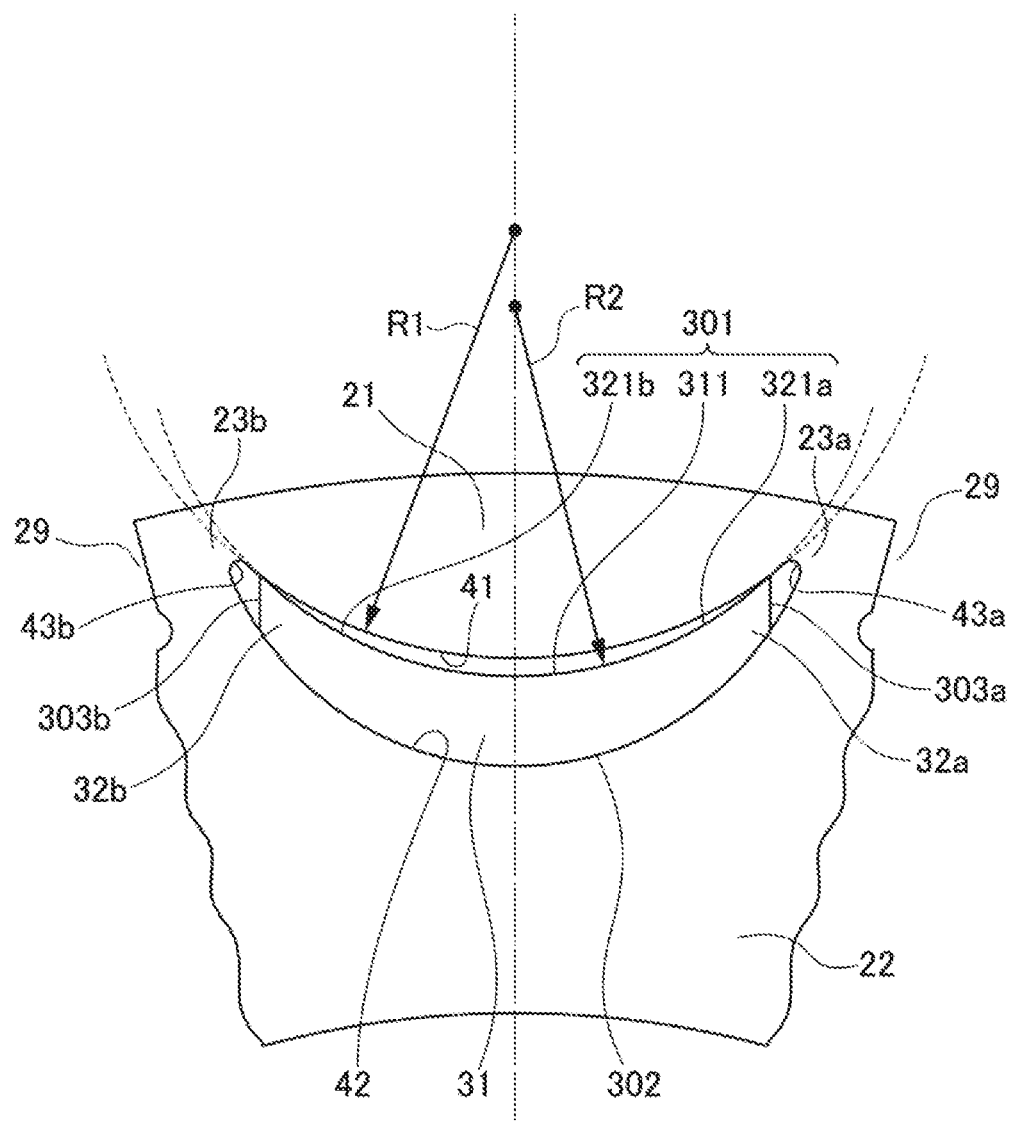
FIG. 4 is an enlarged view illustrating another example of the magnet insertion hole.

As illustrated in FIG. 4, a circular arc radius R1 of the outer-circumference-side inner surface 41 of the magnet insertion hole 40 may be larger than a circular arc radius R2 of the outer-circumference-side outer surface 301 of the permanent magnet 30. In FIG. 4, the arc center of the outer-circumference-side inner surface 41 of the magnet insertion hole 40 and the arc center of the outer-circumference-side outer surface 301 of the permanent magnet 30 are positioned on a line connecting the rotation center (not illustrated) of the rotor 10 and the circumferential center of the magnet insertion hole 40. Incidentally, the arc center may be deviated as long as the circular arc radius R1 of the outer-circumference-side inner surface 41 of the magnet insertion hole 40 is larger than the circular arc radius R2 of the outer-circumference-side outer surface 301 of the permanent magnet 30.

In this way, the outer-circumference-side inner surface 41 of the magnet insertion hole 40 and the outer-circumference-side outer surface 301 of the permanent magnet 30 are both formed in an arc shape which is convex toward the rotation axis line of the rotor 10, and the circular arc radius R1 of the outer-circumference-side inner surface 41 of the magnet insertion hole 40 is larger than the circular arc radius R2 of the outer-circumference-side outer surface 301 of the permanent magnet 30, whereby a gap can be secured between the outer-circumference-side outer surface 311 of the circumferential center portion of the permanent magnet 30 and the outer-circumference-side inner surface 41 of the magnet insertion hole 40. Therefore, with a simple structure, the gap can be reliably secured between the outer-circumference-side outer surface 311 of the circumferential center portion of the permanent magnet 30 and the outer-circumference-side inner surface 41 of the magnet insertion hole 40.

Second Embodiment

Subsequently, a rotor for a rotary electric machine 10A of a second embodiment of the present disclosure will be described with reference to FIGS. 5 and 6. Incidentally, in the following description, the same components as those of the rotor for the rotary electric machine 10 of the first embodiment are denoted by the same reference numerals, and the description thereof is omitted or simplified. Hereinafter, the difference between the rotor for the rotary electric machine 10 of the first embodiment and the rotor for the rotary electric machine 10A of the second embodiment will be described in detail.

Figure 5:
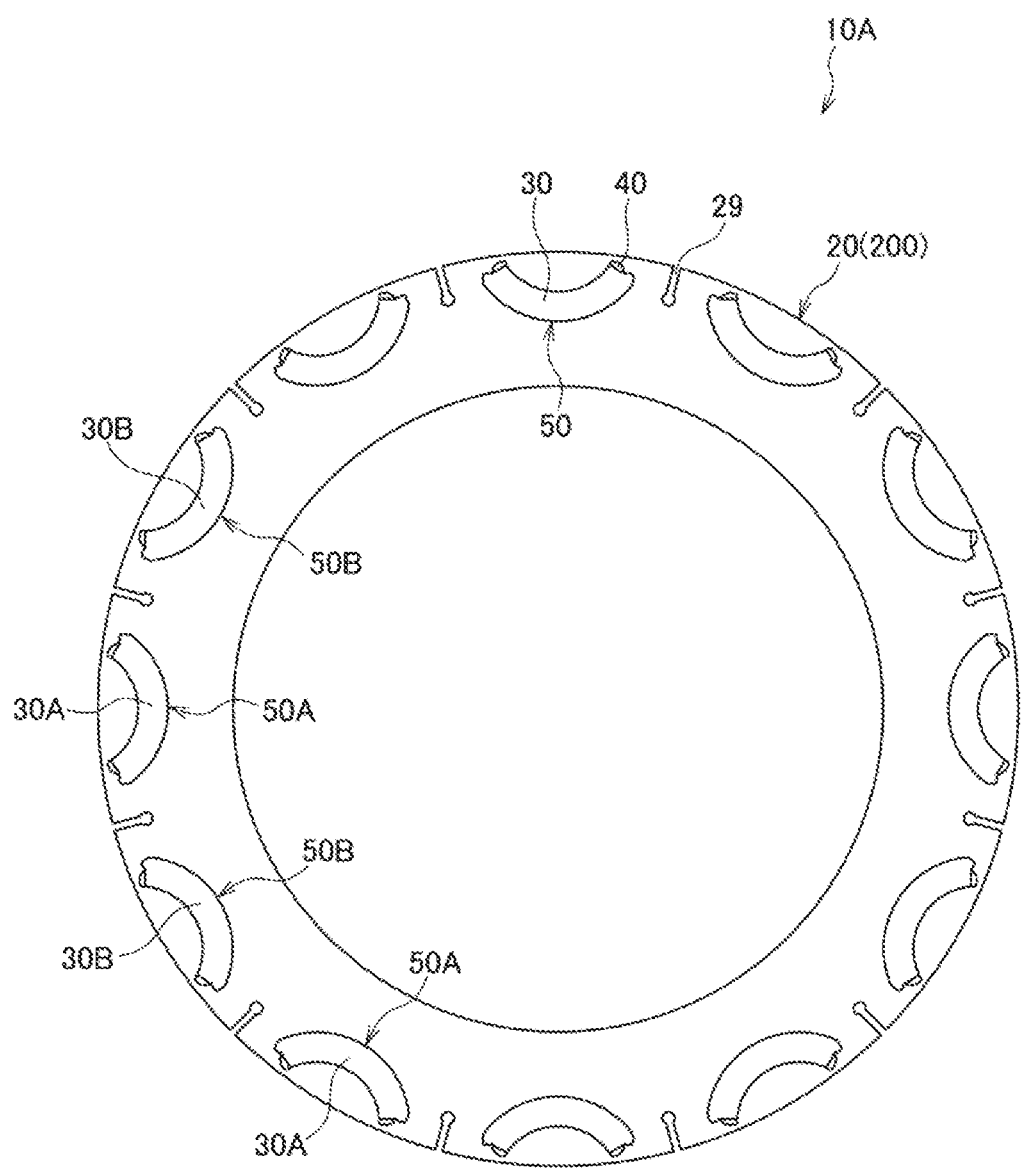
FIG. 5 is a front view illustrating a rotor for a rotary electric machine of a second embodiment when viewed from the rotational axis direction.
Figure 6:
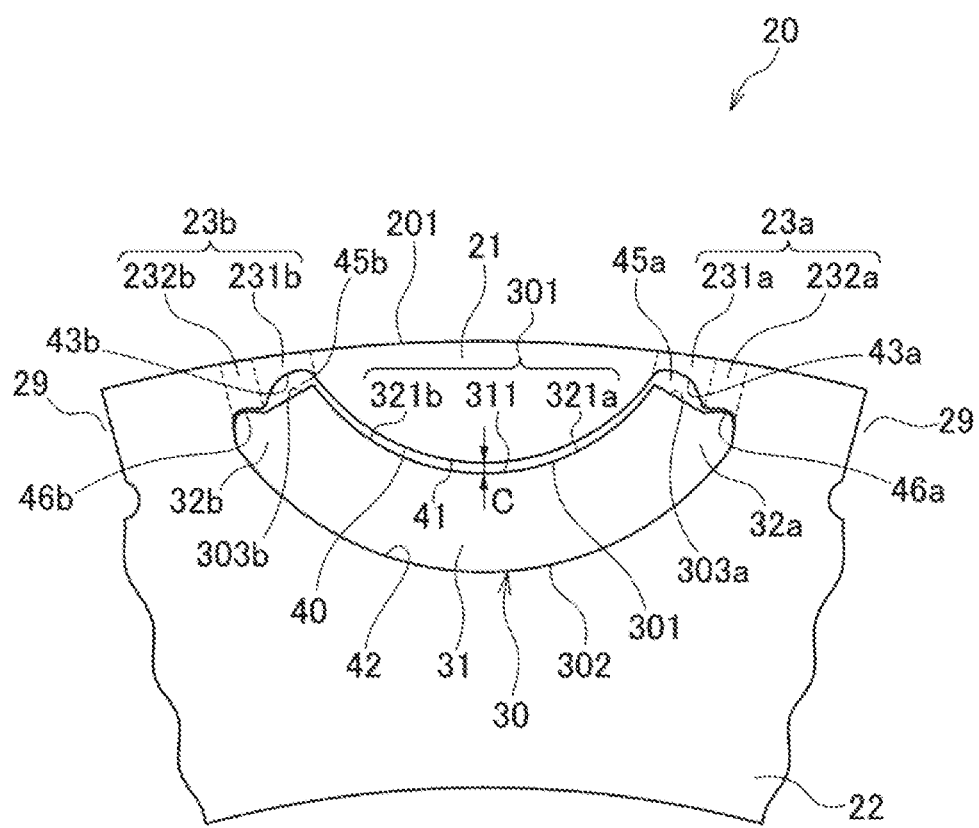
FIG. 6 is an enlarged view illustrating a magnet insertion hole of a rotor core in the rotor for the rotary electric machine of FIG. 5.

In the rotor for the rotary electric machine 10A of the second embodiment, as illustrated in FIGS. 5 and 6, when viewed from the rotation axis line direction of the rotor 10A, the permanent magnet 30 has such an arc shape that the circular arc of the outer-circumference-side outer surface 301 and the circular arc of the inner-circumference-side outer surface 302 are concentric, that is, the thickness is almost constant in the circumferential direction. In addition, the distance of the outer-circumference-side inner surface 41 and the inner-circumference-side lateral inner surface 42 of the magnet insertion hole 40 is almost constant such that the magnet insertion hole 40 has the same shape as the permanent magnet 30.

The connection rib 23a of the rotor core 20 includes an inner rib 231a on the circumferential central side of the magnet insertion hole 40 and an outer rib 232a on the side separated from the circumferential center of the magnet insertion hole 40. The connection rib 23b includes an inner rib 231b on the circumferential central side of the magnet insertion hole 40 and an outer rib 232b on the side separated from the circumferential center of the magnet insertion hole 40.

The magnet insertion hole 40 includes the outer-circumference-side inner surface 41, the inner-circumference-side lateral inner surface 42, the circumferential-one-end-side lateral inner surface 43a, and the circumferential-other-end-side lateral inner surface 43b. The circumferential-one-end-side lateral inner surface 43a and the circumferential-other-end-side lateral inner surface 43b are provided in the connection ribs 23a and 23b, respectively.

In the inner rib 231a of the connection rib 23a, a gap to be a flux barrier 45a is formed between the circumferential-one-end-side lateral inner surface 43a of the magnet insertion hole 40 and the circumferential-one-end-side lateral surface 303a of the permanent magnet 30. In addition, in the outer rib 232a of the connection rib 23a, an abutting part 46a which abuts on the circumferential-one-end-side lateral surface 303a of the permanent magnet 30 is formed in the circumferential-one-end-side inner surface 43a of the magnet insertion hole 40. Further, the permanent magnet 30 is fixed in the rotor core 20 in such a manner the circumferential-one-end-side lateral surface 303a abuts on the abutting part 46a.

Similarly, also in the connection rib 23b, in the inner rib 231b of the connection rib 23b, a gap to be a flux barrier 45b is formed between the circumferential-other-end-side lateral inner surface 43b of the magnet insertion hole 40 and the circumferential-other-end-side lateral surface 303b of the permanent magnet 30. In addition, in the outer rib 232b of the connection rib 23b, an abutting part 46b which abuts on the circumferential-other-end-side lateral surface 303b of the permanent magnet 30 is formed in the circumferential-other-end-side lateral inner surface 43b of the magnet insertion hole 40. Further, the permanent magnet 30 is fixed in the rotor core 20 in such a manner that the circumferential-other-end-side lateral surface 303b abuts on the abutting part 46b.

The circumferential center part 31 of the permanent magnet 30 is separated from the outer-circumference-side inner surface 41 of the magnet insertion hole 40. In the circumferential center part 31 of the permanent magnet 30, a gap C is provided between the outer-circumference-side outer surface 301 of the permanent magnet 30 and the outer-circumference-side inner surface 41 of the magnet insertion hole 40.

Herein, the flux barrier 45a is formed in the inner rib 231a of the connection rib 23a. Thus, the distance of the inner rib 231a from the circumferential-one-end-side lateral inner surface 43a of the magnet insertion hole 40 to a rotor core outer circumferential surface 201 of the rotor core 20 is shorter than the distance of the outer rib 232a from the circumferential-one-end-side lateral inner surface 43a of the magnet insertion hole 40 to the rotor core outer circumferential surface 201 of the rotor core 20. That is, the thickness of the outer rib 232a to the rotor core outer circumferential surface 201 is larger than the thickness of the inner rib 231*a* to the rotor core outer circumferential surface 201.

Similarly, the flux barrier 45*b* is formed in the inner rib 231*b* of the connection rib 23*b*. Thus, the distance of the inner rib 231*b* from the circumferential-other-end-side lateral inner surface 43*b* of the magnet insertion hole 40 to the rotor core outer circumferential surface 201 of the rotor core 20 is shorter than the distance of the outer rib 232*b* from the circumferential-other-end-side lateral inner surface 43*b* of the magnet insertion hole 40 to the rotor core outer circumferential surface 201 of the rotor core 20. That is, the thickness of the outer rib 232*b* to the rotor core outer circumferential surface 201 is larger than the thickness of the inner rib 231*b* to the rotor core outer circumferential surface 201.

In this way, the permanent magnet 30 is fixed in the rotor core 20 by abutting on the inner surface of the magnet insertion hole 40 at the thick abutting parts 46*a* and 46*b* of the outer ribs 232*a* and 232*b*.

Therefore, even when a stress is generated due to the centrifugal force of the permanent magnet 30 or the like during the rotation of the rotor 10A in the connection ribs 23*a* and 23*b*, the stress is received by the thick outer ribs 232*a* and 232*b* to the rotor core outer circumferential surface 201. Thus, the excessive stress on the thin inner ribs 231*a* and 231*b* can be avoided to prevent the deformation of the connection ribs 23*a* and 23*b*.

The gap C is provided between the outer-circumference-side outer surface 301 of the permanent magnet 30 and the outer-circumference-side inner surface 41 of the magnet insertion hole 40. Thus, the excessive stress on the outer-circumference core part 21 during the rotation of the rotor 10 can be avoided although a variation occurs due to the manufacturing error of the permanent magnet 30 or the like. Further, it can be suppressed that a moment where the outer-circumference core part 21 is to be rotated around the connection ribs 23*a* and 23*b* occurs in the connection ribs 23*a* and 23*b*. Thus, it is possible to prevent the deformation of the connection ribs 23*a* and 23*b*.

As illustrated in FIG. 6, the gap C may be provided over the entire area of the outer-circumference-side outer surface 301 of the permanent magnet 30 between the outer-circumference-side outer surface 301 of the permanent magnet 30 and the outer-circumference-side inner surface 41 of the magnet insertion hole 40.

In this case, the entire area of the outer-circumference-side inner surface 41 of the magnet insertion hole 40 does not come into contact with the permanent magnet 30. That is, the permanent magnet 30 does not come into contact with the outer-circumference core part 21 as well as the inner ribs 231*a* and 231*b*. Thus, the deformation of the connection ribs 23*a* and 23*b* can be prevented further.

Incidentally, the above-described embodiment may be modified or improved appropriately. For example, in the second embodiment, the flux barriers 45*a* and 45*b* are provided in the inner ribs 231*a* and 231 *b* of the rotor core 20. However, the flux barriers may be provided to cross the inner ribs 231*a* and 231*b* and the outer-circumference core part 21. In this way, the endmost part of the outer-circumference-side outer surface 321*a* of the circumferential one end of the permanent magnet 30 and the outer-circumference-side outer surface 321*b* of the circumferential other end can be reliably avoided from contacting on the inner ribs 231*a* and 231*b* and the outer-circumference core part 21. Thus, the deformation of the rotor core 20 can be prevented more reliably.

At least the following items are described in this specification. Incidentally, the parentheses indicate the corresponding components or the like in the embodiment, but are not limited thereto.

(1) A rotor for a rotary electric machine (rotor 10) including:

a rotor core (rotor core 20) which rotates around an axial line and include a magnet insertion hole (magnet insertion hole 40) extending in parallel to the axial line; and a permanent magnet (permanent magnet 30) which is housed in the magnet insertion hole, in which the permanent magnet has an arc shape which is convex toward the axial line when viewed from a direction of the axial line, the rotor core includes an outer-circumference core part (outer-circumference core part 21) which is positioned on an outer-circumference-side of the magnet insertion hole, an inner-circumference core part (inner-circumference core part 22) which is positioned on an inner-circumference-side of the magnet insertion hole, and connection ribs (connection ribs 23*a* and 23*b*) which are positioned in both circumferential ends of the magnet insertion hole and connect the outer-circumference core part and the inner-circumference core part, the permanent magnet is supported in the rotor core in such a manner that circumferential ends (a circumferential one end 32*a* and a circumferential other end 32*b*) which are positioned on both circumferential sides of the permanent magnet abut on an inner surface of the magnet insertion hole, and a circumferential center portion (circumferential center part 31) of the permanent magnet is separated from an outer-circumference-side inner surface (outer-circumference-side inner surface 41) of the magnet insertion hole, and in the circumferential center portion of the permanent magnet, a gap (gap C) is provided between an outer-circumference-side outer surface (outer-circumference-side outer surface 301) of the permanent magnet and the outer-circumference-side inner surface of the magnet insertion hole.

According to (1), the permanent magnet having the arc shape which is convex toward the axial line is supported in the rotor core in such a manner that the circumferential ends which are positioned on the both circumferential sides of the permanent magnet abut on the inner surface of the magnet insertion hole. On the other hand, the circumferential center portion of the permanent magnet is separated from the outer-circumference-side inner surface of the magnet insertion hole. Thus, in the circumferential center portion of the permanent magnet, the gap is provided between the outer-circumference-side outer surface of the permanent magnet and the outer-circumference-side inner surface of the magnet insertion hole. In this way, the outer-circumference-side inner surface of the magnet insertion hole does not come into contact with the outer-circumference-side outer surface of the circumferential center portion of the permanent magnet. Thus, the excessive stress on the outer-circumference core part during the rotation of the rotor can be avoided although a variation occurs due to the manufacturing error of the permanent magnet or the like. Further, it can be suppressed that a moment where the outer-circumference core part is to be rotated around the connection ribs occurs in the connection ribs. Thus, it is possible to prevent the deformation of the connection ribs. Therefore, even when a stress is generated due to the centrifugal force of the permanent magnet or the like during the rotation of the rotor in the rotor core, it is possible to reduce the stress which is generated in the outer-circumference core part of the rotor core and prevent the deformation of the connection rib having a relatively low strength.

(2) The rotor for the rotary electric machine according to (1), in which the circumferential ends of the permanent magnet are circumferential ends (an outer-circumference-side outer surface 321a of the circumferential one end and an outer-circumference-side outer surface 321b of the circumferential other end) of the outer-circumference-side outer surface of the permanent magnet which faces the outer-circumference-side inner surface of the magnet insertion hole, and a convex part (convex part 44) which abuts on the circumferential ends of the permanent magnet is provided in the outer-circumference-side inner surface of the magnet insertion hole.

According to (2), the permanent magnet is fixed in the rotor core in such a manner that the outer-circumference-side outer surfaces of both circumferential ends abut on the convex part. Therefore, the gap between the outer-circumference-side outer surface of the circumferential center portion of the permanent magnet and the outer-circumference-side inner surface of the magnet insertion hole can be secured in a state where the outer-circumference-side outer surfaces of the both circumferential ends of the permanent magnet abut on the outer-circumference-side inner surface of the magnet insertion hole.

(3) The rotor for the rotary electric machine according to (1), in which the circumferential ends of the permanent magnet are circumferential ends of the outer-circumference-side outer surface of the permanent magnet which face the outer-circumference-side inner surface of the magnet insertion hole, the outer-circumference-side inner surface of the magnet insertion hole has an arc shape which is convex toward the axial line, and a circular arc radius (circular arc radius R1) of the outer-circumference-side inner surface of the magnet insertion hole is larger than a circular arc radius (circular arc radius R2) of the outer-circumference-side outer surface of the permanent magnet.

According to (3), the outer-circumference-side inner surface of the magnet insertion hole and the outer-circumference-side outer surface of the permanent magnet are both formed in an arc shape which is convex toward the rotation axis line of the rotor, and the circular arc radius of the outer-circumference-side inner surface of the magnet insertion hole is larger than the circular arc radius of the outer-circumference-side outer surface of the permanent magnet, whereby a gap can be secured between the outer-circumference-side outer surface of the circumferential center portion of the permanent magnet and the outer-circumference-side inner surface of the magnet insertion hole. Therefore, with a simple structure, the gap can be reliably secured between the outer-circumference-side outer surface of the circumferential center portion of the permanent magnet and the outer-circumference-side inner surface of the magnet insertion hole.

(4) The rotor for the rotary electric machine (rotor 10A) according to (1), in which the circumferential ends of the permanent magnet are circumferential-end-side lateral surfaces (a circumferential-one-end-side lateral surface 303a and a circumferential-other-end-side lateral surface 303b) of the permanent magnet which face circumferential lateral inner surfaces (a circumferential-one-end-side lateral inner surface 43a and a circumferential-other-end-side lateral inner surface 43b) of the magnet insertion hole, the circumferential lateral inner surfaces of the magnet insertion hole are provided in the connection ribs, the connection ribs include inner rib parts (inner ribs 231a and 231b) which are positioned on a central side of the magnet insertion hole in a circumferential direction and outer rib parts (outer ribs 232a and 232b) which are positioned on a side separated from a center of the magnet insertion hole in the circumferential direction, flux barriers (flux barriers 45a and 45b) are provided between the inner rib parts and the circumferential end side lateral surfaces of the permanent magnet, and abutting parts (abutting parts 46a and 46b) which abut on the circumferential end side lateral surfaces of the permanent magnet are provided in the outer rib parts.

According to (4), the flux barrier is formed in the inner rib of the connection rib. Thus, the distance of the inner rib from the circumferential-one-end-side lateral inner surface of the magnet insertion hole to the rotor core outer circumferential surface of the rotor core is shorter than the distance of the outer rib from the circumferential-one-end-side lateral inner surface of the magnet insertion hole to the rotor core outer circumferential surface of the rotor core. That is, the thickness of the outer rib to the rotor core outer circumferential surface is larger than the thickness of the inner rib to the rotor core outer circumferential surface. In this way, the permanent magnet is fixed in the rotor core by abutting on the inner surface of the magnet insertion hole at the thick abutting parts of the outer ribs. Therefore, even when a stress is generated due to the centrifugal force of the permanent magnet or the like during the rotation of the rotor in the connection ribs, the stress is received by the thick outer ribs to the rotor core outer circumferential surface. Thus, the excessive stress on the thin inner ribs can be avoided to prevent the deformation of the connection ribs. In addition, a gap is provided between the outer-circumference-side outer surface of the permanent magnet and the outer-circumference-side inner surface of the magnet insertion hole. Thus, the excessive stress on the outer-circumference core part during the rotation of the rotor can be avoided although a variation occurs due to the manufacturing error of the permanent magnet or the like. Further, it can be suppressed that a moment where the outer-circumference core part is to be rotated around the connection ribs occurs in the connection ribs. Thus, it is possible to prevent the deformation of the connection ribs.

(5) The rotor for the rotary electric machine according to (4), in which the gap (gap C) is provided over a circumferential entire area of the permanent magnet between the outer-circumference-side outer surface (outer-circumference-side outer surface 301) of the permanent magnet and the outer-circumference-side inner surface (outer-circumference-side inner surface 41) of the magnet insertion hole.

According to (5), the entire area of the outer-circumference-side inner surface of the magnet insertion hole does not come into contact with the permanent magnet. That is, the permanent magnet does not come into contact with the outer-circumference core part as well as the inner ribs. Thus, the deformation of the connection ribs can be prevented further.

What is claimed is:

1. A rotor for a rotary electric machine, comprising:
    a rotor core which rotates around an axial line and includes a magnet insertion hole extending in parallel to the axial line; and
    a permanent magnet which is housed in the magnet insertion hole, wherein
    the permanent magnet has an arc shape which is convex toward the axial line when viewed from a direction of the axial line,
    the rotor core includes:
        an outer-circumference core part which is positioned on an outer-circumference-side of the magnet insertion hole;
        an inner-circumference core part which is positioned on an inner-circumference-side of the magnet insertion hole; and
        connection ribs which are positioned in both circumferential ends of the magnet insertion hole and connect the outer-circumference core part and the inner-circumference core part,
    the permanent magnet is supported in the rotor core in such a manner that circumferential ends which are positioned on both circumferential sides of the permanent magnet abut on an inner surface of the magnet insertion hole,
    a circumferential center portion of the permanent magnet is separated from an outer-circumference-side inner surface of the magnet insertion hole,
    in the circumferential center portion of the permanent magnet, a gap is provided between an outer-circumference-side outer surface of the permanent magnet and the outer-circumference-side inner surface of the magnet insertion hole, and
    a whole of circumferential end side lateral surfaces of the permanent magnet do not abut on circumferential lateral inner surfaces of the magnet insertion hole.

2. The rotor for the rotary electric machine according to claim 1, wherein
    the circumferential ends of the permanent magnet are circumferential ends of the outer-circumference-side outer surface of the permanent magnet which faces the outer-circumference-side inner surface of the magnet insertion hole, and
    a convex part which abuts on the circumferential ends of the permanent magnet is provided in the outer-circumference-side inner surface of the magnet insertion hole.

3. The rotor for the rotary electric machine according to claim 1, wherein
    the circumferential ends of the permanent magnet are circumferential ends of the outer-circumference-side outer surface of the permanent magnet which face the outer-circumference-side inner surface of the magnet insertion hole,
    the outer-circumference-side inner surface of the magnet insertion hole has an arc shape which is convex toward the axial line, and
    a circular arc radius of the outer-circumference-side inner surface of the magnet insertion hole is larger than a circular arc radius of the outer-circumference-side outer surface of the permanent magnet.

* * * * *